United States Patent
Kindt-Larsen et al.

(10) Patent No.: US 11,370,162 B2
(45) Date of Patent: Jun. 28, 2022

(54) THREE-DIMENSIONAL PRINTING OF OPTICAL DEVICES

(71) Applicant: ATHENEUM OPTICAL SCIENCES, LLC, Orange Park, FL (US)

(72) Inventors: Ture Kindt-Larsen, Holte (DK); Wallace Anthony Martin, Orange Park, FL (US); Ganesh Narayanan Kumar, Ponte Vedra Beach, FL (US); Michel Luclen Guillon, Jersey (GB)

(73) Assignee: ATHENEUM OPTICAL SCIENCES, LLC, Orange Park, FL (US)

( * ) Notice: Subject to any disclaimer, the term of this patent is extended or adjusted under 35 U.S.C. 154(b) by 315 days.

(21) Appl. No.: 16/462,585

(22) PCT Filed: Nov. 20, 2017

(86) PCT No.: PCT/EP2017/079711
§ 371 (c)(1),
(2) Date: May 21, 2019

(87) PCT Pub. No.: WO2018/095837
PCT Pub. Date: May 31, 2018

(65) Prior Publication Data
US 2020/0079006 A1 Mar. 12, 2020

Related U.S. Application Data

(60) Provisional application No. 62/425,992, filed on Nov. 23, 2016.

(51) Int. Cl.
*B29C 64/112* (2017.01)
*B33Y 10/00* (2015.01)
(Continued)

(52) U.S. Cl.
CPC .......... *B29C 64/112* (2017.08); *B29C 64/364* (2017.08); *B29D 11/00009* (2013.01);
(Continued)

(58) Field of Classification Search
CPC ................. B29C 64/112; B29C 64/364; B29L 2011/001; B29D 11/00009; B33Y 80/00; B33Y 70/00; B33Y 40/00
See application file for complete search history.

(56) References Cited

U.S. PATENT DOCUMENTS 5,271,875 A 12/1993 Appleton et al.
5,760,100 A 6/1998 Nicolson et al.
(Continued)

FOREIGN PATENT DOCUMENTS

CN 1055069 A 10/1991
EP 2392473 A1 12/2011
(Continued)

OTHER PUBLICATIONS

Arceneaux, Mitigation of Oxygen Inhibition in UV LED, UVA and Low Density UV Cure, Allnex Belgium SA (2014).
(Continued)

*Primary Examiner* — Larry W Thrower
(74) *Attorney, Agent, or Firm* — Marshall, Gerstein & Borun LLP

(57) ABSTRACT

The present application discloses a method for three-dimensional deposition printing to manufacture optical elements including ophthalmic devices by controlling the level of oxygen in the polymerization mixture and the printing environment to achieve precision in form and smoothness of surface for image quality optical performance.

22 Claims, 4 Drawing Sheets

(51) Int. Cl.
  *B33Y 40/00*   (2020.01)
  *B33Y 70/00*   (2020.01)
  *B29C 64/364*  (2017.01)
  *B29D 11/00*   (2006.01)
  *B33Y 80/00*   (2015.01)
  *B29L 11/00*   (2006.01)

(52) U.S. Cl.
  CPC .............. *B33Y 10/00* (2014.12); *B33Y 40/00* (2014.12); *B33Y 70/00* (2014.12); *B29L 2011/0016* (2013.01); *B33Y 80/00* (2014.12)

(56) References Cited

U.S. PATENT DOCUMENTS

| | | | |
|---|---|---|---|
| 5,843,346 | A | 12/1998 | Morrill |
| 6,861,123 | B2 | 3/2005 | Turner et al. |
| 7,860,594 | B2 | 12/2010 | Andino et al. |
| 8,840,235 | B2 | 9/2014 | Blessing |
| 9,180,634 | B2 | 11/2015 | Widman et al. |
| 9,266,294 | B2 | 2/2016 | Widman et al. |
| 2003/0099783 | A1 | 5/2003 | Karita |
| 2003/0164571 | A1 | 9/2003 | Crump et al. |
| 2005/0046957 | A1 | 3/2005 | Lai et al. |
| 2010/0259589 | A1 | 10/2010 | Barry et al. |

FOREIGN PATENT DOCUMENTS

| | | |
|---|---|---|
| WO | WO-87/04390 A1 | 7/1987 |
| WO | WO-92/00820 A1 | 1/1992 |
| WO | WO-97/22019 A1 | 6/1997 |
| WO | WO-2014/126837 A2 | 8/2014 |
| WO | WO-2016/014563 A1 | 1/2016 |

OTHER PUBLICATIONS

Caló et al., Biomedical applications of hydrogels: A review of patents and commercial products, Eur. Polymer J., 65:252-67 (Apr. 2015).

International Application No. PCT/EP2017/079711, International Search Report and Written Opinion, dated Feb. 15, 2018.

Kiyoi, The State of UV-LED Curing: An Investigation of Chemistry and Applications, RadTech Report, Issue 2 pp. 32-36 (2013).

FIG. 3

Evaluation of Hydrated Hydrogel Samples

|  | PM | Atmosphere | Cross-section of hydrated lens | Non-hydrated surface | Hydrated Lens | |
|---|---|---|---|---|---|---|
|  | Equiv. $O_2$ vol-% | $O_2$ vol-% |  |  | Appearance; % Transmittance | Center thickness μm |
| PM-1A, 1.6% x-link | | | | | | |
| 1 | < 0.5% | 0.1 |  | Not tacky | Clear 94.98% | 166 |
| 2 | < 0.5% | 1.0 |  | Slightly tacky | Clear 95.76% | 153 |
| 3 | < 0.5% | 2.1 | 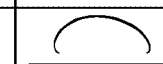 | Tacky | Hazy 91.51% | 172 |
| 4 | < 0.5% | 5.3 |  | Very tacky | Hazy 80.09% | 166 |
| PM-1B, 1.6% x-link | | | | | | |
| 1 | 2% | 0.1 | 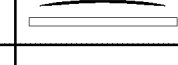 | Not tacky | Clear 96.37% | 213 |
| 2 | 2% | 1.0 |  | Tacky | Hazy n.d. | 240 |
| 3 | 2% | 2.0 |  | Tacky | Hazy n.d. | 249 |
| 4 | 2% | 5.0 | x-section not possible | Liquid on top | Hazy n.d. | |

FIG. 3 (continuation)

|  | PM | Atmosphere | Cross-section of hydrated lens | Non-hydrated surface | Hydrated Lens | |
|---|---|---|---|---|---|---|
|  | Equiv. $O_2$ vol-% | $O_2$ vol-% |  |  | Appearance; % Transmittance | Center thickness µm |
| PM-1C, 1.6% x-link |  |  |  |  |  |  |
| 1 | 5% | 0.1 |  | Not tacky | Clear 93.90% | 220 |
| 2 | 5% | 1.0 |  | Tacky | slightly hazy n.d. | 207 |
| 3 | 5% | 2.0 |  | Tacky | Hazy n.d. | 245 |
| 4 | 5% | 5.0 |  | Liquid on top | Hazy n.d. | 237 |
| PM-2, 1.2% x-link |  |  |  |  |  |  |
| 1 | < 0.5% | 0.1 |  | Not tacky | Clear 93.93% | 294 |
| 2 | < 0.5% | 0.5 |  | Not tacky | v slight hazy 94.48% | 233 |
| 3 | < 0.5% | 1.0 |  | Tacky | Hazy 92.46% | 229 |
| ACUVUE2 | - | - |  | - | 96.83 % | n.d. |

"n.d." indicate that no measurement was conducted.

THREE-DIMENSIONAL PRINTING OF OPTICAL DEVICES

CROSS REFERENCE TO RELATED APPLICATIONS

This application is a U.S. National Stage of International Application No. PCT/EP2017/076711, filed Nov. 20, 2017, which claims the benefit of U.S. Provisional Patent Application No. 162/425,992, filed Nov. 23, 2016, each of which is fully incorporated herein by reference.

FIELD OF THE INVENTION

The present invention relates to the field of polymeric optical elements, in particular ophthalmic devices, which can be prepared by three-dimensional printing techniques.

BACKGROUND OF THE INVENTION

Oxygen inhibition is a problem for coatings that cure via free-radical polymerization (Arcenaux, Jo Ann, *Mitigation of oxygen inhibition in UV LED, UVA and low intensity UV cure*, Allnex, U.S.A. (2014); Kiyoi, Ed., *The State of UV-LED curing: An Investigation of Chemistry and Applications*, Radtech Report, Issue 2 (2013), pp. 33-34; Odian, G., *Principles of Polymerization*, McGraw Hill (1981), p. 249; Decker, C., J. Coating Technology (1987), NO. 751, pp. 59-65; Calo, E. and Khutoryanskiy, V.V., European Polymer J., 65 (2015), pp. 254-255).

Since oxygen is present at about 21% in air, oxygen inhibition of free radical polymerization is a very relevant problem to deal with during energy curing of polymeric materials. There are several methods used to reduce or overcome oxygen inhibition. US 2003/0164571 discloses an in-mold coating process. US 2010/0259589 A1 discloses an inert UV inkjet printing process without requiring complete evacuation of atmospheric oxygen.

Contact lens manufacturing (Calo and Khutoryanskiy (2015)) has evolved over the past several decades from lathe cutting to spin-cast molding to cast molding which remains as the most cost effective process. Cast molding of contact lenses involves depositing a curable mixture of polymerizable monomers in a mold cavity formed by two mold sections, curing the monomer mixture, disassembling the mold assembly and removing the lens. One mold section forms the anterior lens surface, and the other mold section forms the posterior lens surface. The cost of cast-molding is still high due to the fabrication of optical quality metal inserts and subsequent injection molding of the plastic molds with associated wastage in each of these processes. This coupled with managing an inventory of a huge number of SKUs, a family of contact lenses made by a lens molding process can only have a limited number of variations in optical power and/or choices of base curve, diameter etc.

Several patents exist that cover both materials and cast molding processes. WO 87/04390, U.S. Pat. Nos. 5,271,875, 5,843,346, 6,861,123 and 5,760,100. U.S. Pat. No. 7,860,594 B2 discloses a method for producing an ophthalmic device by means of stereolithography. The CLIP "continuous liquid interface production" process is disclosed in WO 2014126837 A2.

Other methods such as free forming of lenses have been disclosed. U.S. Pat. Nos. 9,180,634 and 9,266,294 disclose methods for generating one or both of an ophthalmic lens precursor with at least a portion of one surface free-formed from a reactive mixture WO 2016/014563 A1 (Chapoy) discloses a process for toric lenses and other specialty lenses utilizing a 3-dimensional printer in order to add special features on existing lenses. EP 2,392,473 B1 and U.S. Pat. No. 8,840,235 B2 (both Luxexcel Holding BV.) disclose a method of printing optical structures on a substrate by ejecting droplets of a transparent printing ink and curing the deposited droplets by UV radiation.

OBJECT OF THE INVENTION

In view of the state of the art, a need clearly exists to manufacture optical elements, such as hydrogel based ophthalmic devices by minimizing waste and reducing costs along with the flexibility of making customized and specialty optical elements such as spectacle lenses, contact lenses and intraocular lenses.

SUMMARY OF THE INVENTION

As noted above, oxygen is a critical variable in the free-radical polymerization of monomeric materials and prepolymers. This is particularly relevant for ophthalmic devices such as those of hydrogels containing relatively low levels of cross-linker which are to be hydrated after polymerization and which might very easily be distorted in shape from variations in the polymer network. It has been discovered that, during polymerization, if the oxygen concentration were to be higher on one side (Side 1) of the optical device compared to the other side, Side 1 may expand relatively more than the other side, and a distortion of the optical properties may occur.

In the 3D printing industry, relatively "high" concentrations of initiators, high intensity UV light energy as well as oxygen scavengers, waxes or coatings are commonly used to manage the effects of oxygen. However, to date none of these has been shown to be capable of fabricating image quality optics.

The present invention takes a novel approach in the use of 3D printing to create optical elements, like ophthalmic devices, by controlling the presence and concentration of oxygen to low levels and at the same time in adjusted concentrations. The present inventors have found that it is necessary to control the level of oxygen in the polymerizable mixture with respect to that of the atmosphere to obtain the desired dimensional and resultant optical properties of the optical element. This principle may also be extended to include the substrate on which the deposition printing occurs. Hence, the oxygen level should be maintained at a predetermined level during the polymerization process.

So, in a first aspect the present invention relates to a method for three-dimensional deposition printing of an optical element, in which method a plurality of droplets of a polymerizable mixture are deposited onto the surface of a substrate under a controlled atmosphere thereby forming successive layers of droplets of the polymerizable mixture, wherein the controlled atmosphere has an oxygen concentration of at the most 5.0 volume-%, and wherein the oxygen equilibrium concentration of the polymerizable mixture is at the most 8.0 volume-%.

BRIEF DESCRIPTION OF THE FIGURES

FIG. 3 is a table summarizing the results of the evaluation of hydrated hydrogel samples described herein. "n.d." indicates no measurement was conducted.

DETAILED DISCLOSURE OF THE INVENTION

Figure 1:
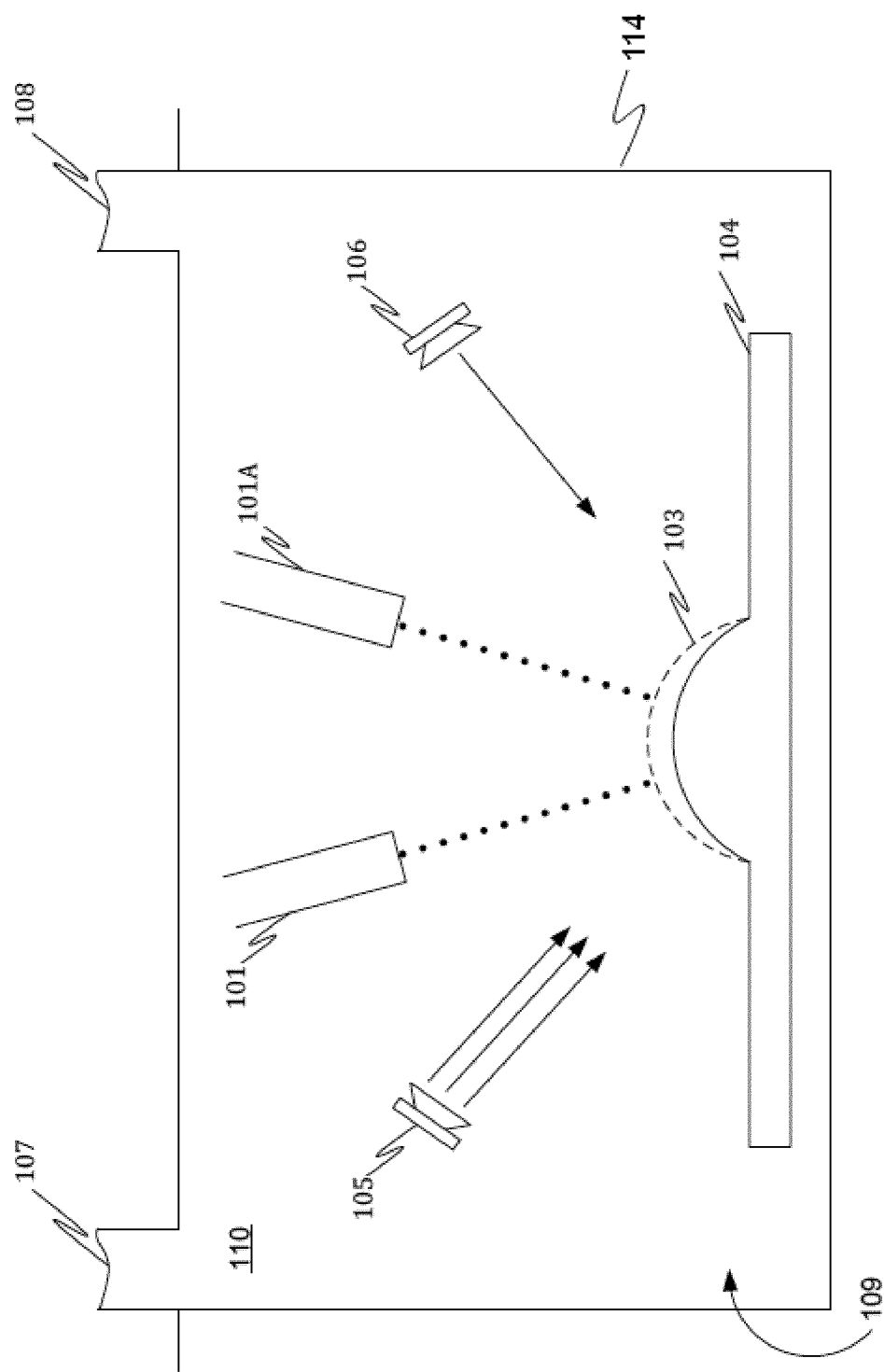
FIG. 1 is a diagrammatic example of a 3D printing system 110 showing one or more 3D print heads 101 and 101A for deposition of droplets of a polymerizable mixture, one or more LED UV source(s) 105 and 106 which may contain one or more UV LEDs of the same or different emitting wavelengths of light, a substrate 104 (in this case a curved surface) and an illustrative lens 103 which has been built up on the substrate, all contained in an enclosure 114 with one or more ports 107 and 108 for providing a controlled atmosphere 109 within the enclosure 114.

In the following discussion, ophthalmic lenses will be used for illustrative and discussion purposes, however the principles can be more broadly used in any optical element demanding precise dimensional shapes and optical properties and similar uniform polymer properties in general.

From a polymer synthesis point of view, droplet three-dimensional deposition printing using monomers or "inks" is very different from conventional methods like lathing, cast molding, stereolithography and vat 3D printing, and resin 3D printing, in that the way a polymerizable mixture is delivered to the substrate and subsequent layers which are used to build the article is substantially different. The polymerizable mixture is delivered in the form of extremely small droplets of typically 1-15 picoliter amounts at high velocities through a gaseous atmosphere with relatively high surface to volume ratios. When considering the number of droplets (estimated to be between 1.5 and 9 million) required to form a 25 milligram lens, several factors must be considered. These include but not limited to: the exposure to ambient process conditions, the thickness of resulting layer of material when it impacts the substrate, the interaction/wetting of the substrate and the impinging droplets, the exposure time between subsequent layers and curing/polymerization. Thus, there is significant opportunity for exposure to and uptake of oxygen from the receiving substrate surface and previously deposited droplets, and in particular from the ambient process atmosphere (herein, the controlled atmosphere); if such factors are not considered and controlled, both surface and bulk properties including optical properties will be adversely affected.

It is easier to realize the impact of oxygen when the lenses are produced using hydrogel materials such as 2-hydroxyethyl methacrylate (HEMA) or other monomers used in soft contact lenses and soft intraocular lenses. In these materials, the variations are more obvious in the final cured lenses after the absorption of water. The surface or skin regions with more oxygen present contain more polymer network defects than the bulk allowing more water to be absorbed in these areas. The resulting distortion in these skin regions usually has a negative impact on the overall mechanical properties (modulus, tensile strength, elongation), optical properties (light transmission, refractive index etc.), shape, and part to part repeatability.

It is through the invention of adjusting the oxygen content of the polymerizable mixture (PM) in relation to that of the controlled atmosphere (as described herein) that the effects of oxygen can be controlled to an extent that the properties of the optical element are not significantly impacted. In the case of ophthalmic devices, especially contact lenses and intraocular lenses, the ability to create an optical prescription is highly dependent on precise shapes of curved surfaces. Producing these required surfaces on these and other non-ophthalmic optical elements can be achieved by using the principles claimed in this invention, thus enabling the benefits of using 3D deposition printing such as simplicity, efficiency, more degrees of freedom in design, lower time requirements, and costs.

Because the influence of oxygen in the polymerization process and the resulting negative impact on properties have been eliminated or substantially reduced, another embodiment of this invention is to control of the movement of the polymerization mixture post deposition during the formation of a polymer matrix in layers. This may be critical in the creation of curved, arbitrary or irregular surfaces or shapes, and more so when creating complex optical devices requiring precise curved surfaces. Therefore, the combined effects of overcoming oxygen inhibition and controlling the movement of the polymerization mixture in optical product applications will likely reduce and even eliminate optical artifacts and distortions.

Hence, the present invention i.a. provides a method for three-dimensional deposition printing of an optical element, e.g. an ophthalmic device, in which method a plurality of droplets of a polymerizable mixture are deposited onto the surface of a substrate under a controlled atmosphere thereby forming successive layers of droplets of the polymerizable mixture.

An interesting feature of the present invention is that the oxygen concentration in polymerizable mixture is adjusted in relation to the oxygen concentration of the controlled atmosphere (and in certain embodiments also that the oxygen concentration in other parts of the environment, in particular the substrate onto which the droplets are deposited, is adjusted in relation to the oxygen concentration of the controlled atmosphere) so that migration of oxygen from one source to the other is avoided or at least suppressed to an insignificant degree.

Definitions

When used herein, the expression "oxygen equilibrium concentration of the polymerizable mixture of "X" is intended to mean the oxygen concentration in the polymerizable mixture obtained if the mixture hypothetically is allowed to equilibrate at 1.0 atm. (1013 mbar) with an atmosphere having the an oxygen concentration of X %.

When used herein, the term "optical element" is intended to include but not limited to ophthalmic devices, lenses used in industrial applications, lenses for endoscopes, inspection devices, fiber optics devices, camera lenses, telescopic lenses etc. Currently particularly interesting embodiments hereof are ophthalmic devices.

In some embodiments, the optical element has one or more objects embedded therein, e.g. a solid object selected from inserts, electronics, and functional additive releasing reservoirs or depots.

In other embodiments, the optical element includes one or more functionally active substances including biologically active substances.

As used herein an "ophthalmic device" is any device which is in front of the eye or resides in or on the eye or any part of the eye, including the cornea, eyelids and ocular glands. These devices can provide optical correction, cosmetic enhancement (e.g. for iris color), vision enhancement, therapeutic benefit (for example as bandage lenses) or devices which deliver therapeutic agents such as lubricants, wetting agents, active pharmaceutical ingredients (API) and biological agents which may be anti-inflammatory, anti-allergy, anti-bacterial, anti-infective, anti-hypertensive, etc. or delivery of nutraceuticals, vitamins and antioxidants for ocular health or a combination of any of the foregoing. Illustrative examples of ophthalmic devices include those selected from a spectacle lens, a contact lens (e.g. a soft contact lens or a hard contact lens), an intraocular lens, an overlay lens, a corneal implant, such as a corneal inlay implant, and an ophthalmic/ocular insert.

Particularly interesting ophthalmic devices are those selected from lenses, in particular contact lenses and intraocular lenses.

In one embodiment, the ophthalmic device is a contact lens, in particular a "soft" contact lens, i.e. a contact lens of a hydrogel material.

The term "hydrogel" refers to crosslinked polymers which have absorbed water ("swelled") to a water content of at least 10 weight-% thereof. Preferably such hydrogel materials have a water content of at least 20 weight-%, such as at least 25 weight-%, and up to 70 to 90 weight-%. The ability to absorb water can be determined as described in the section on Experimental Details—Method of Measuring Water Content of Hydrogel Devices.

When used herein, the term "polymerizable mixture" (occasionally referred to as "PM") refers to a liquid mixture of components (reactive and possibly also non-reactive components) which upon exposure to an external energy (e.g. actinic radiation 280-450 nm (like UV-light or blue light) or heat) is capable of undergoing polymerization to form a polymer or polymer network. Typically, the mixture comprises reactive components such as monomers, macromers, prepolymers, cross-linkers, and initiators. Moreover, the polymerizable mixture may further comprise other ingredients like additives such as wetting agents, release agents, dyes, light absorbing compounds such as UV absorbers and photochromic compounds, any of which may be reactive or non-reactive but are capable of being retained within the resulting ophthalmic device, as well as pharmaceutical, vitamins, antioxidants and nutraceutical compounds. It will be appreciated that a wide range of additives may be added based upon the ophthalmic device which is made, and its intended use.

The fact that the mixture is "polymerizable" typically implies that one or more constituents thereof (like monomer, macromers, prepolymers, crosslinkers, etc.) comprise at least one polymerizable functional group, such as an ethylenically unsaturated group, like it is the case for (meth)acrylate, (meth)acrylamide, vinyl, N-vinyl lactam, N-vinylamide, and styryl functional groups.

In some embodiment, the polymerizable mixture contains at least one hydrophilic component. In one embodiment, the hydrophilic components can be selected from the hydrophilic monomers, e.g. those known to be useful to prepare hydrogels.

As used herein, "hydrophilic" means that at least 5 grams of the compound(s) are soluble in 100 mL of deionized water at 25° C. under weakly acidic (pH between 5 and 7) or basic conditions (pH form 7 to 9), and in some embodiments 10 grams of the compound(s) are soluble in 100 mL of deionized water at 25° C. under weakly acidic or basic conditions. In contrast hereto, "hydrophobic" means that 5 grams of the compound do not fully dissolve in 100 mL of deionized water at 25° C. under weakly acidic or basic conditions. The solubility of the compounds can be confirmed by visual observation, with any visible precipitants or turbidity indicating that the compound is hydrophobic. Solubility is determined after about 8 hours of mixing or stirring.

One class of suitable hydrophilic monomers includes acrylic- or vinyl-containing monomers. Such hydrophilic monomers may themselves be used as crosslinking agents, however, where hydrophilic monomers having more than one polymerizable functional group are used, their concentration should be limited as discussed above to provide a contact lens having the desired modulus.

The term "vinyl-type" or "vinyl-containing" monomers refer to monomers containing the vinyl grouping ($-CH=CH_2$) and that are capable of polymerizing. Examples of hydrophilic vinyl-containing monomers include, but are not limited to, monomers such as N-vinyl amides, N-vinyl lactams (e.g. N-vinylpyrrolidone ("NVP")), N-vinyl-N-methyl acetamide, N-vinyl-N-ethyl acetamide, and N-vinyl-N-ethyl formamide, N-vinyl formamide. Alternative vinyl-containing monomers include, but are not limited to, 1-methyl-3-methylene-2-pyrrolidone, 1-methyl-5-methylene-2-pyrrolidone, and 5-methyl-3-methylene-2-pyrrolidone.

"Acrylic-type" or "acrylic-containing" monomers are those monomers containing the acrylic group: ($CH_2=CRCOX$) wherein R is H or $CH_3$, and X is O or N, which are also known to polymerize readily, such as N,N-dimethyl acrylamide ("DMA"), 2-hydroxyethyl methacrylate ("HEMA"), glycerol methacrylate, 2-hydroxyethyl methacrylamide, polyethyleneglycol monomethacrylate, methacrylic acid, and mixtures thereof.

Other hydrophilic monomers that can be employed in the invention include, but are not limited to, polyoxyethylene polyols having one or more of the terminal hydroxyl groups replaced with a functional group containing a polymerizable double bond. Examples include polyethylene glycol, ethoxylated $C_{1-20}$ alkyl glucosides, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups. Other suitable hydrophilic monomers will be apparent to one skilled in the art.

In one embodiment, the hydrophilic component comprises at least one hydrophilic monomer such as DMA, HEMA, glycerol methacrylate, 2-hydroxyethyl methacrylamide, NVP, N-vinyl-N-methyl acrylamide, polyethyleneglycol monomethacrylate, and combinations thereof. In another embodiment, the hydrophilic monomers comprise at least one of DMA, HEMA, NVP and N-vinyl-N-methyl acrylamide and mixtures thereof. In another embodiment, the hydrophilic monomer comprises DMA and/or HEMA.

The hydrophilic component(s) (e.g., hydrophilic monomer(s)) may be present in a wide range of amounts, depending upon the specific balance of properties desired. In one embodiment, the amount of the hydrophilic component is up to 60 weight-%, such as from 5 to 40 weight-% based upon all reactive components.

Hydrophobic silicone-containing components (or silicone components) are those that contains at least one [—Si—

O—Si] group in a monomer, macromer or prepolymer. In one embodiment, the Si and attached O are present in the silicone-containing component in an amount greater than 20 weight percent, such as greater than 30 weight percent of the total molecular weight of the silicone-containing component. Useful silicone-containing components include polymerizable functional groups such as acrylate, methacrylate, acrylamide, methacrylamide, N-vinyl lactam, N-vinylamide, and styryl functional groups.

Also, cross-linking monomers may be employed, either singly or in combination, include ethylene glycol dimethacrylate, trimethylolpropane trimethacrylate, glycerol trimethacrylate, polyethylene glycol dimethacrylate (wherein the polyethylene glycol has a molecular weight up to, e.g., 400), and other polyacrylate and polymethacrylate esters. The cross-linking monomer is used in the usual amounts, e.g., from 0.1 to 5, and preferably in amounts of from 0.2 to 3, parts by weight per 100 parts by weight of the polymerizable mixture.

Other monomers that can be used include methacrylic acid, which is used to influence the amount of water that the hydrogel will absorb at equilibrium. Methacrylic acid is usually employed in amounts of from 0.2 to 8 parts by weight per 100 parts of the hydrophilic monomers like HEMA. Other monomers that can be present in the polymerization mixture include methoxyethyl methacrylate, acrylic acid, and the like.

As was mentioned above, one of the features of the invention is that hydrophobic monomers may be included in the polymerizable mixture without encountering incompatibility problems to the degree that such problems are encountered with prior art methods of polymerizing HEMA-based copolymers.

In embodiments, the polymerizable mixture comprises hydroxyethyl methacrylate (HEMA) or hydroxyethyl acrylate (HEA) monomers, preferably hydroxyethyl methacrylate (HEMA) monomers.

In embodiments, the polymerizable mixture comprises methacrylate or acrylate monomers not being hydroxyethyl methacrylate or hydroxyethyl acrylate monomers.

In embodiments, the polymerizable mixture comprises reactive silicone monomers or oligomers.

In a further embodiment, the polymerizable mixture after polymerization provides a polymer which is non-swellable in water, i.e. is not able to take up obtain a water content of more than 2 weight-%.

One or more polymerization initiators may be included in the reaction mixture. Examples of polymerization initiators include, but are not limited to, compounds such as lauryl peroxide, benzoyl peroxide, isopropyl percarbonate, azobisisobutyronitrile, and the like, that generate free radicals at moderately elevated temperatures, and photo-initiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photo-initiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphineoxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate. Commercially available ultra-violet and visible light initiator systems include, but are not limited to, Irgacure 819® and Irgacure 1700® (from Ciba Specialty Chemicals) and Lucirin TPO initiator (available from BASF). Commercially available UV photo-initiators include Irgacure 651, Darocur 1173 and Darocur 2959 (Ciba Specialty Chemicals). These and other photo-initiators which may be used are disclosed in Volume III, Photoinitiators for Free Radical Cationic & Anionic Photopolymerization, 2nd Edition by 3. V. Crivello & K. Dietliker; edited by G. Bradley; John Wiley and Sons; New York; 1998.

The polymerization initiator is used in the reaction mixture in effective amounts to initiate polymerization of the reaction mixture, such as 0.1 to 2 weight-%. Polymerization of the reaction mixture can be initiated using the appropriate choice of heat or visible or ultraviolet light or other means depending on the polymerization initiator used. Alternatively, initiation can be conducted without a photo-initiator using, for example, e-beam. However, when a photo-initiator is used, the preferred initiators are bisacylphosphine oxides, such as bis(2,4,6-trimethylbenzoyl)-phenyl phosphine oxide (Irgacure 819®) or a combination of 1-hydroxycyclohexyl phenyl ketone and DMBAPO, and in another embodiment the method of polymerization initiation is via visible light activation.

In one embodiment, the reaction mixture includes one or more internal wetting agents. Internal wetting agents may include, but are not limited to, high molecular weight, hydrophilic polymers. Examples of internal wetting agents include, but are not limited to, polyamides such as poly(N-vinyl pyrrolidone) and poly(N-vinyl-N-methyl acetamide).

The internal wetting agent(s) may be present in a wide range of amounts, depending upon the specific parameter desired. In one embodiment, the amount of the wetting agent(s) is up to 50 weight-%, such as from 5 to 40 weight-%, such as from 6 to 30 weight-% based upon all reactive components.

Moreover, the polymerizable mixture may contains one or more auxiliary components selected from, but not limited to, chelating agents, polymerization inhibitors, viscosity regulating agents, surface tension regulating agents, glass transition regulating agents, compatibilizing components, ultraviolet absorbing compounds, medicinal agents like ophthalmic pharmaceutical agents, ophthalmic demulcents, excipients, antimicrobial compounds, copolymerizable and non-polymerizable dyes, release agents, reactive tints, pigments, and chelating agents, and combinations thereof. In one embodiment, the sum of such auxiliary components may be up to 20 weight-%.

The polymerizable mixture is typically prepared by simple mixing of the constituents thereof.

In one embodiment, the reactive components (e.g., hydrophilic monomers, wetting agents, and/or other components) are mixed together either with or without an inert diluent to form the reaction mixture. These diluents have the added advantage of controlling the expansion of the ophthalmic device upon hydration assisting in solubility of components as well regulating the glass transition temperature.

Classes of suitable diluents include, without limitation, alcohols having 3 to 20 carbons, amides having 10 to 20 carbon atoms derived from primary amines, ethers, polyethers, ketones having 3 to 10 carbon atoms, and carboxylic acids having 8 to 20 carbon atoms. As the number of carbons increase, the number of polar moieties may also be increased to provide the desired level of water miscibility. In some embodiments, primary and tertiary alcohols are preferred. Preferred classes include alcohols having 4 to 20 carbons and carboxylic acids having 10 to 20 carbon atoms.

In one embodiment, the diluents are selected from 1,2-octanediol, t-amyl alcohol, 3-methyl-3-pentanol, decanoic acid, 3,7-dimethyl-3-octanol, 2-methyl-2-pentanol, 2-ethyl-1-butanol, 3,3-dimethyl-2-butanol, tripropylene methyl ether (TPME), butoxy ethyl acetate, mixtures thereof and the like.

In one embodiment, the diluents are selected from those that have some degree of solubility in water. In some embodiments at least about three percent of the diluent is miscible with water. Examples of water soluble diluents include, but are not limited to, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, ethanol, decanoic acid, octanoic acid, dodecanoic acid, 1-ethoxy-2-propanol, 1-tert-butoxy-2-propanol, EH-5 (commercially available from Ethox Chemicals), 2,3,6,7-tetrahydroxy-2,3,6,7-tetramethyl octane, 9-(1-methylethyl)-2,5,8,10,13,16-hexaoxaheptadecane, 3,5,7,9,11,13-hexamethoxy-1-tetradecanol, mixtures thereof and the like. Esters of alcohols such as boric acid esters of alcohols are other embodiments of diluents.

The amount of diluent is typically up to 60 weight-%, such as from 10 to 60 weight-%, such as from 20 to 50 weight-%, based upon the complete polymerizable mixture.

In embodiments, the polymerizable mixture includes one or more cross-linkers in an amount of 0.5 to 5.0 weight-%, one or more non-reactive diluents (such as polyhydric alcohols, esters of polyhydric alcohols or ethers of polyhydric alcohols, e.g. glycerols and glycerol esters) in an amount of 0 to 60.0 weight-%, and one or more polymerization inhibitors in an amount of less than 100.0 ppm and preferably less than 50.0 ppm, based on the weight of the polymerizable mixture.

The viscosity of the polymerizable mixture may also play an important role, and is typically 1-25 cP, such as 2-15 cP, in particular 3-10 cP.

As mentioned above, the oxygen equilibrium concentration of the polymerizable mixture is preferably 0.05-8.0 volume-%, e.g. 0.2-6.0 volume-%, e.g. in the range of 0.5-6 volume-%. The lower limits (such as 0.05%, 0.1%, 0.2% etc.) are stated for practical reasons and it is quite possible to achieve even lower concentrations.

The oxygen content of the polymerizable mixture may be adjusted to the desired level (X) by exposing the polymerizable mixture (previously being mixed under an ambient atmosphere (1013 mbar, 21 volume-% $O_2$)) to a reduced pressure P, where $P=X*1013/21$ mbar. Subsequently the vacuum can be released and the oxygen-adjusted polymerizable mixture can be stored under an atmosphere having an oxygen concentration corresponding to a suitably atmosphere having an oxygen concentration of X.

In some preferred embodiments, the oxygen concentration in the controlled atmosphere is lower than the oxygen equilibrium concentration in the polymerizable mixture.

3D-Printing Device

The deposition of a plurality of droplets is typically achieved using a conventional inkjet printhead. Such conventional printheads are capable of simultaneous deposition of a plurality of droplets of a liquid either in a one-dimensional pattern (in the form of lines) or in a two-dimensional pattern. For the sake of speed and accuracy, it is preferred that the inkjet printhead is capable of simultaneous deposition of a two-dimensional pattern of the polymerizable mixture so that one layer or multiple layers of droplets of the polymerizable mixture representing the size of the ophthalmic device can be printed.

More preferably, as it is the case for the working examples disclosed herewith, the two-dimensional pattern achievable by the printhead is representing a size (area) which at least the size ("area") of the ophthalmic device. A suitable commercially available printing head for this purpose is the Samba™ printhead from Fujifilm, e.g. Samba™ G3L Printhead which has 2048 nozzles per module and is capable of deposition of liquids in the order of 2.4 picoliter for native drop size to 13.2 picoliter maximum drop size at a 1200 native dpi accuracy.

The pattern of each layer of droplets deposited by the 3D-printing device, is determined in relation to the desired shape of the target optical element. For example (in case of an ophthalmic device), data gathered from measuring a patient's eye may be used to generate input. Data may include, for example, optical characteristics, surface properties, size and shape dimensions and observations of an ocular disease state. Three-dimensional (3D) printable models may be created based upon a computer aided design (CAD) package or scan of a patient's eye. Patient eye scanning may include collecting and analyzing digital data representative of the shape and appearance of a patient's eye. Based on collected data, a three-dimensional model of the target ophthalmic device may then be produced. A 3D model may be processed by software to convert the model into a series of thin layers and produce a file containing instructions tailored to a specific type of 3D printer.

The Substrate

The plurality of droplets of the polymerizable mixture is deposited onto the surface of the substrate. Suitable materials for the substrate are glass, polyolefins like polypropylene, polystyrene, etc.

The form of the substrate is to typically represent the shape of one side of the (non-hydrated) ophthalmic device, i.e. it is typically curved. The size can be reduced in order to fit the required dimension of the finished hydrated ophthalmic device. The substrate may be formed by lathing, grinding, injection molding and/or several of these methods. Because of this forming, there is a rotational axis in the parts. However, the substrate may also in itself be prepared by means of 3D-printing. Thereby, the surface structure of the substrate can be formed by depositing droplets in a relative arbitrary fashion without the constraint of rotation allowing for optical surface shapes not obtainable through conventional means.

In order to adjust the wettability of the surface of the substrate, the surface may be pre-treated with surfactant, or subject to UV, ozone or plasma treatment, or a combination of the above. Hence, for example a glass or polymer substrate may be pre-treated with Tween 80 or a silicone surfactant such as Dow Corning Additive 67, Additive 14, Additive 57, Xiameter OFX-0193 etc. Sometimes the surfactant could be included in the polymerizable mixture.

In some embodiments, the oxygen concentration in the substrate is also in equilibrium with the oxygen concentration in the controlled atmosphere.

In order to obtain an oxygen concentration in the substrate which is in equilibrium with the oxygen concentration in the controlled atmosphere, the substrate may simply be allowed to be exposed to the controlled atmosphere (or a corresponding atmosphere) prior to the deposition of the droplets, e.g. for a period of at least 8 hours.

In some embodiments, the substrate may be capable of only including a very limited amount of oxygen therein, hence, it may be not be necessary to take any particular precautions with respect to the oxygen concentration in the substrate.

In an alternative embodiment, the substrate is in itself an optical device, such as an ophthalmic device (such as a regular commercial contact lens), that is modified by the method described herein so as to form a final ophthalmic device e.g. having different optical properties.

The Controlled Atmosphere

The controlled atmosphere in which the deposition printing takes place plays an important role in that it should preferably ensure a suitably low concentration of oxygen with which the oxygen content of the polymerizable mixture can be appropriately controlled.

Hence, typically the controlled atmosphere has an oxygen concentration of at the most 5.0 volume-%. In some embodiments, the oxygen concentration in the controlled atmosphere is at the most 2.0 volume-%, e.g. 0.01-2.0 volume-%, such as 0.03-1.5 volume-%, e.g. in the range of 0.05-1.2 volume-%, such as 0.1-1.1 volume-%, and more preferably at the most 1.0 volume-%. The lower limits (such as 0.01%, 0.03%, 0.05% etc.) are stated for practical reasons and it is quite possible to achieve even lower concentrations.

The controlled atmosphere under which the deposition of the polymerizable mixture takes place is most conveniently at a pressure of 1.0 atm. (1013 mbar) which corresponds to an oxygen concentration of 21 volume-%. A lower oxygen concentration than the 21 volume-% found in a normal atmosphere may suitably be obtained by mixing of atmospheric air with another inert gas like nitrogen, helium, argon etc., preferably nitrogen, or by mixing pure oxygen with another gas like nitrogen. One preferred approach for controlled atmosphere would be to use nitrogen as the inert gas to displace atmospheric oxygen to achieve an oxygen concentration at the desired level.

The actual oxygen concentration may be monitored by an oxygen meter and regulated at the start of the procedure, and preferably also intermittently or continuously controlled during the process of preparing the optical element.

Printing of Layers and Curing

In the method of the invention a plurality of droplets of a polymerizable mixture are deposited onto the surface of a substrate under a controlled atmosphere thereby forming successive layers of droplets of the polymerizable mixture.

The polymerizable mixture is typically deposited using a 3D-printing device, e.g. as described above.

In embodiments, the individual droplets have a volume of 0.5-50 pL, such as 1-40 pL or 1.5-30 pL, like 2.0-15 pL.

In some embodiments, the plurality of droplets of the polymerizable mixture is deposited onto the surface of the substrate thereby forming successive layers of droplets of the polymerizable mixture, and the disposed successive layers are subsequently exposed to actinic radiation or heat after the deposition of the final of the successive layers of droplets for forming the ophthalmic device. In variants where the disposed successive layers are exposed to actinic radiation, in particular UV light, the polymerizable mixture may include a photo-initiator. In the variants where the disposed successive layers are exposed to heat, the polymerizable mixture may include a thermal initiator.

In some variants hereof, the disposed successive layers are exposed to actinic radiation (e.g. UV light) after each deposition of a layer of droplets. In particular, the degree of polymerization obtained by such intermittent exposure to actinic radiation (e.g. UV light) is typically only for the purpose of obtaining gelation of the polymerizable mixture so as to ensure that the droplets of the respective layer are kept in place upon deposition of the subsequent layer.

Hence, in some embodiments, the plurality of droplets of the polymerizable mixture are deposited onto the surface of the substrate thereby forming successive layers of droplets of the polymerizable mixture, said disposed successive layers may optionally be exposed to actinic radiation after deposition of each layer and/or exposed to actinic radiation after the deposition of the final of the successive layers of droplets for forming the optical element.

In some variant hereof, a series of successive layers, e.g. 2-20 layers, may be deposited before exposing the deposited layers to intermittent actinic radiation.

In some embodiments, the maximum thickness of each layer is up to 50 μm, and in particular up to a maximum of 25 μm.

In embodiments, the polymerizable mixture contains one or more polymerization initiators, e.g. selected from thermal initiators and photo-initiators.

In a variant hereof, wherein the polymerizable mixture contains a plurality of, such as two, photo-initiators having responsiveness to different wavelengths of actinic radiation. This is particularly interesting when it is desirable to utilize UV light at one wavelength for the intermittent exposure (gelation) and another wavelength for the final curing of the optical element.

Hence, in an embodiment a first polymerization initiator is used in building successive layers, and a second polymerization initiator is used to complete the curing process.

In the present application with claims, the term "actinic radiation" is understood as radiation of a wavelength of in the range of 280-450 nm. In some embodiments, the applicable radiation has a wavelength in the range of 315-450 nm corresponding to UVA and blue light.

In addition to controlling the level of oxygen in the polymerizable mixture, some embodiments of the present invention also solve some of the challenges discussed above by carefully controlling the polymerization such that as the optical element is being fabricated, the degree of polymerization in the individual layers upon deposition is limited to a degree of gelation to stop or substantially slow the movement of the polymerization mixture while allowing subsequent droplets and layers to meld and form the structure without distortion. Another popular term used is "UV pinning" for this gelation process or gelling. It is the process of applying a dose of ultraviolet (UV) light to a UV curable ink (UV ink). The light's wavelengths must be correctly matched to the ink's photochemical properties. As a result, the ink droplets move to a higher viscosity state, but stop short of full cure. This is also referred to as the "gelling" of the ink as previously described. UV pinning or gelation (or gelling) enhances the management of flow and form and provides the highest possible image quality.

In embodiments, this is achieved primarily through the choice and concentration of photo-initiators, choice and concentrations of cross-linkers, as well as UV light sources, intensity of light and duration of exposure. Examples of sources of actinic radiation may include light emitting diodes ("LED") or light bulbs, lasers or the like.

In one specific embodiment, two photo-initiators absorbing at two different wavelengths are used with corresponding UV LED light sources (e.g. at 365 nm and at 400 nm). This concept is that one initiator is present in a concentration capable of starting the gelation of the polymerizable mixture but insufficient to complete the polymerization. This enables each of the individual layers to come to the same relative degree of conversion prior to final cure. The final polymerization throughout the optical element is done as a separate step using the second photo-initiator/UV LED light combination resulting in a uniform polymer network required for optical function. As an alternative hereto, a thermal initiator which is active at or above the Tg is used instead of or in addition to the second photo-initiator to complete the curing. It is also observed that, without the control of the oxygen content of the polymerizable mixture throughout the deposition of the successive layers, and during the final curing step, the inhibition effects would adversely impact the uniformity of the polymer network and could even lead to incompletely cured and tacky product.

In embodiments wherein the deposition printing is on curved surfaces, the very first or first few layers may be deposited as patterns of dots on a curved surface, but otherwise employing the approach outlined above. The patterns of dots would be of such size that surface tension would maintain the patterns of dots in place until partially cured. Subsequent deposition of droplets from the print head would then fill in the spaces left behind by the first layer or layers until a complete layer is established as a foundational layer to build the final optical element upon. Alternative to the dot patterns is deposition of droplets to form a very thin layer (e.g. 1 micron to 8 microns) and building an optical element with many such thin layers.

In 3D printing, one of the major concerns is premature gelation or polymerization of inks in the print head. Replacement of the print heads, repair time and loss of production can be costly. This concern is much greater when using reactive monomers with low levels of inhibitors and implementing low oxygen levels. It is highly desirable to minimize or eliminate this potential. In order to achieve concurrent printing and UV pinning of the material to stop or slow the movement of the ink or polymerizable mixture once deposited until all layers are added prior to final cure, one of the embodiments of this invention is to isolate the UV light source from the print head essentially eliminating or substantially reducing the potential of gelation/polymerization in the head. Isolating the print head from the UV source and using the principles of this invention of controlling both oxygen levels and movement of polymerization mixture, allows the fabrication of precise shapes and optical devices without artifacts in the matrix which might adversely affect the optical performance of the final lens.

It is preferred that no washing with a solvent or water occurs, e.g. to remove excess monomers, after the application of individual of the successive layers, but before the final curing is performed.

Figure 2:
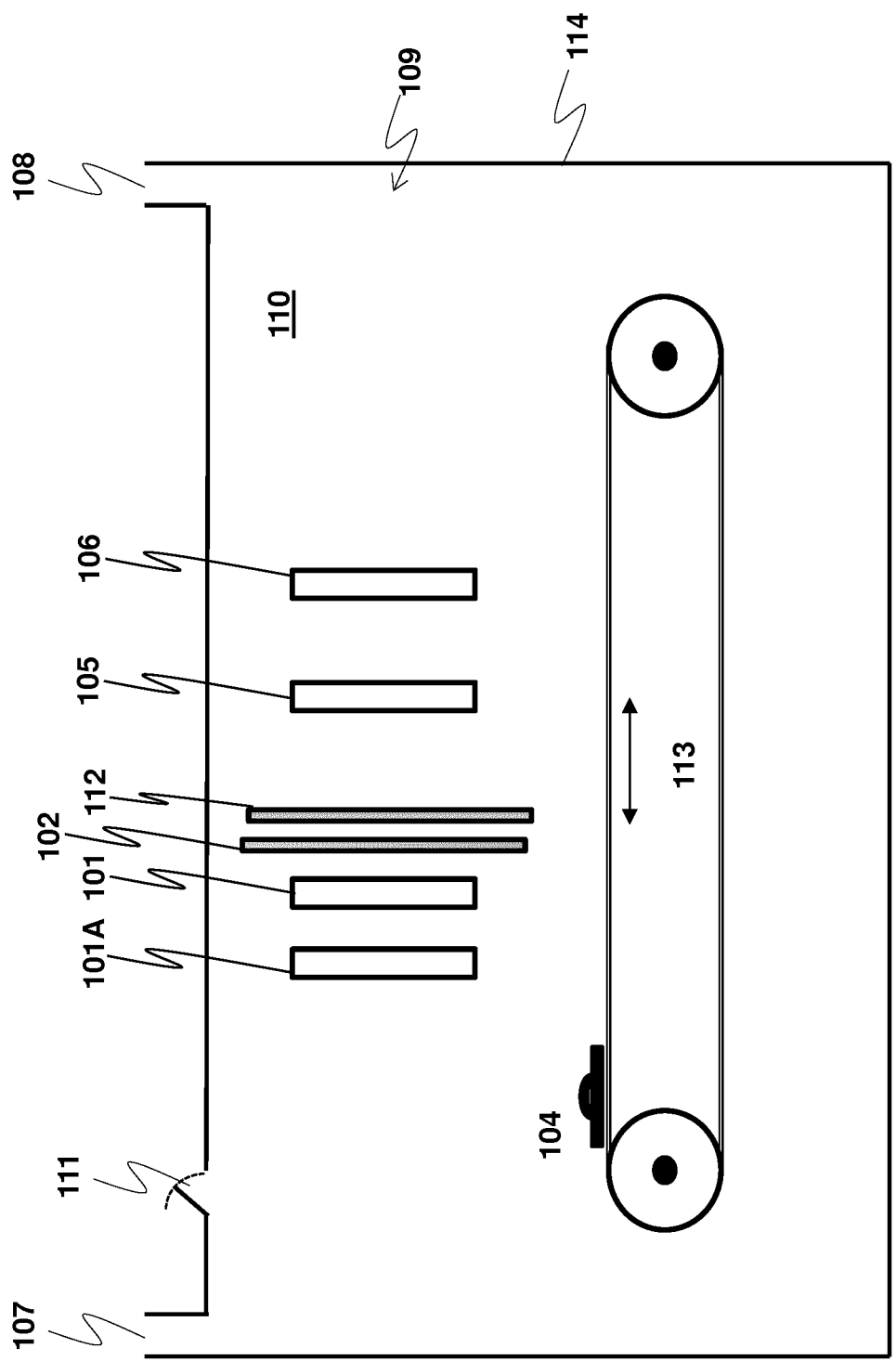
FIG. 2 is a schematic figure of an alternative 3D printing system 110. The same reference numbers are used as for FIG. 1 (3D print heads 101 and 101A LED UV source(s) 105 and 106, substrate 104, an enclosure 114 with one or more ports 107 and 108). Additionally, the embodiment of FIG. 2 shows an oxygen sensor 102, gate 111 for moving components in and out of enclosure 114, a UV blocking screen 112 and an actuation structure 113 (e.g. a belt drive or linear drive) configured to provide relative movement between the substrate 104 and said one or more 3D print heads 101, 101A and/or said one or more LED UV source(s) 105, 106.

In one embodiment and with reference to FIGS. 1 and 2, a system 110 is described in a block diagram. Substrate 104 may be positioned proximate to, such as beneath one or more 3D-printing devices. The relationship of "beneath or underneath" is derived from a direction of gravity. The system includes a 3D-printing device having print head 101 and another 3D-printing device having print head 101A that dispenses droplets of polymerizable mixture (PM) to the substrate 104 to form successive layers of the PM in the desired shape of the target optical element 103.

Following the application of the droplets of PM to the substrate, actinic radiation such as ultraviolet or blue light is supplied to the layer(s) of PM via a source of actinic radiation 105. Final cure can be done at a different wavelength beneath source of actinic radiation 106. The final cure can optionally take place at elevated temperature.

According to some embodiments, a first print head 101 of the system 110 may provide a first PM and a second print head 101A may provide a second PM which may be compositionally different from the first PM and which may include functional additives or a non polymerizable mixture (e.g. functional additives or solvents containing functional additives).

The ambient conditions within the system 110, in particular with respect to the oxygen content of the controlled atmosphere 109, but possibly also with respect to temperature, ambient light, etc., are typically controlled.

In conditions where substrate 104 is capable of transmitting actinic radiation, sources of radiation 105 and 106 may both or either individually or in alternate combinations be located beneath or at an angle to substrate 104 as well as that shown in FIG. 1.

The nature of the ambient gaseous environment can be controlled, for example, through the use of purging nitrogen gas though the inlets 107, 108. Purging can be performed to increase or reduce oxygen partial pressure to predetermined levels.

FIG. 2 shows a 3D printing system 110 similar to that of FIG. 1, which comprises an actuation structure 113 configured to provide relative movement between the substrate 104 and said one or more 3D print heads 101, 101A and/or said one or more LED UV source(s) 105, 106. Therefore, the substrate 104 is movable with respect to said one or more 3D print heads 101, 101A and/or said one or more LED UV source(s) 105, 106; or said one or more 3D print heads 101, 101A and/or said one or more LED UV source(s) 105, 106 are movable with respect to said substrate 104. Although a belt drive is illustrated as the actuation structure 113, other arrangements can be used. The actuation structure 113 is coupled to the print head(s) so that relative movement of the substrate 104/print heads 101, 101A can be coordinated with deposition of material from the print head(s).

By means of the system described above, the optical element may be formed through a plurality of print heads with the first print head dispensing droplets of a first polymerizable mixture and one or more additional print head(s) each dispensing droplets of compositions selected from the first polymerizable mixture, a second polymerizable mixture which is compositionally different from said first polymerizable mixture, and a non-polymerizable mixture.

In some embodiments, the first and/or second polymerizable mixtures comprise functionally active substances, and/or the non-polymerizable mixture comprises functionally active substances, e.g. a such substances in dissolved form.

Release of the Ophthalmic Device from the Substrate and Post-Treatment

Subsequent to the preparation of the optical element (e.g. ophthalmic device), the device is typically released from the substrate. Although it is intended that the optical device is sufficiently physically bound to the substrate during its preparation, care should be taken that no covalent bonds are formed between the optical element and the substrate during its preparation, including the curing thereof.

The ophthalmic device may be released (or removed) from the substrate by physical means so as to be able to manipulate the device in various ways, e.g. by means of washing to remove by-products, soaking in buffered saline, tinting, marking and packaging. Also, and in particular when the ophthalmic device is a hydrogel polymer, it may be soaked with water or a buffered saline solution so as to be allowed to expand and thereby enabling release from the substrate. Release agents are compounds or mixtures of compounds which, when combined with water, decrease the time required to release a contact lens from the substrate, as compared to the time required to release such a lens using an aqueous solution that does not comprise the release agent.

Although typically preferred, it is not strictly necessary that the curing of the ophthalmic device is completed before release from the substrate.

In one embodiment, after curing, the lens is subjected to extraction to remove unreacted components. The extraction may be done using conventional extraction fluids, such organic solvents, such as alcohols or may be extracted using water or aqueous solutions such as buffered saline or a combination thereof. In various embodiments, extraction can be accomplished, for example, via immersion of the lens in an aqueous solution or exposing the lens to a flow of an aqueous solution. In various embodiments, extraction can also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

The ophthalmic device may also be sterilized by known means such as, but not limited to, autoclaving and radiation sterilization. Sterilization may take place before or after packing, preferably after packing.

Also, the optical element, e.g. an ophthalmic device, may be packed. The ophthalmic device is typically packaged in an aqueous solution.

For ophthalmic devices of hydrogels, the packing may include packing in a physiological saline solution with around 0.9% sodium chloride and suitable buffering agents such as phosphate or borate buffer systems. In addition, the packing solution may include one or more functionally active substances including biologically active substances.

Aqueous solutions may also include additional water soluble components such as release agents, wetting agents, lubricating agents, active pharmaceutical ingredients (API), vitamins, antioxidants and nutraceutical components, combinations thereof and the like. In one embodiment, the aqueous solutions comprise less than 10 weight-%, and in others less than 5 weight-% organic solvents such as isopropyl alcohol, and in another embodiment are free from organic solvents. Depending on the composition, the aqueous solutions may or may not require special handling, such as purification, recycling or special disposal procedures.

In one embodiment, the aqueous content of the hydrogel devices in the present invention comprise at least 30 weight-% water, in some embodiments at least 50 weight-% water, in some embodiments at least 70 weight-% water and in others at least 90 weight-% water.

In embodiments, the polymerizable mixture comprises hydroxyethyl methacrylate (HEMA) monomers, and the method comprises the subsequent step of swelling the optical element, preferably an ophthalmic device, in water, whereby the optical element obtains a water content from 10 to 80 weight-%, and preferably from 35 to 70 weight-%.

In embodiments, the polymerizable mixture comprises acrylate monomers not including HEMA monomers, and the method comprises the subsequent step of swelling the optical element, preferably an ophthalmic device, in water, whereby the optical element obtains a water content from 10 to 80 weight-%, and preferably from 35 to 70 weight-%.

In embodiments, the polymerizable mixture comprises reactive silicone precursors, and the method comprises the subsequent step of swelling the optical element, preferably an ophthalmic device, in water, whereby the optical element obtains a water content from 5 to 70 weight-%, and preferably from 10 to 50 weight-%.

Novel Ophthalmic Devices

It is envisaged that the methods of the present invention provide novel ophthalmic devices, such as those listed below:

A contact lens or intraocular lens is formed according to the methods of this invention with a non-rotationally symmetrical surface, with corresponding optical corrections, including very steep radii of curvature and very high spherical and cylindrical corrective components.

A contact lens or intraocular lens is formed according to the methods of this invention having multiple spherical and cylindrical corrections within the same lens as opposed to a single spherical corrective power reflecting the power distribution map of the eye and not just the average corrective power of refractive power from a phoropter or refractometer.

A contact lens or intraocular lens is formed according the methods of this invention which is capable of (due to non-rotational symmetry) correcting optical aberrations resulting from poor surgical outcomes of PRK or LASIK or LASEK surgery or from aberrations due to an unusual corneal surface.

General Remarks

Although the present description and claims occasionally refer to a mixture, an initiator, etc., it should be understood that the materials and compositions defined herein may comprise one, two or more types of the individual constituents. In such embodiments, the total amount of the respective constituent should correspond to the amount defined above for the individual constituent.

The "(s)" in the expressions: mixture(s), initiator(s), etc. indicates that one, two or more types of the individual constituents may be present. On the other hand, when the expression "one" is used, only one (1) of the respective constituent is present.

It should be understood that the expression "%" means the percentage of the respective component by weight, unless otherwise noted.

Experimental Details

Methods

Method for Determining Water Content of Hydrogel Devices

The water content for hydrogel devices (e.g. contact lenses) is determined as described in: ISO/DIS 18369-4: 2016 in Section 4.6 (Gravimetric Method given in 4.6.2).

Keratometry Measurements

The keratometry technique was modified for the measurement of the contact lenses. The keratometer measures the central radii of the cornea and in this case the central radii of the front of the non-hydrated hydrogel parts formed on PMMA domes. (see experimental section on 3-D printing on PMMA domes). The instrumentation used was the autokeratometer from Nidek model ARK900S. The support was set on a horizontal platform and wedges added to align the centre and the axis of the PMMA dome bearing the hydrogel surface with the centre and axis of the keratometer. In the first set of measurements made which had a large amount of astigmatism the wedges were not used and the astigmatism measured was an artifact due to the measurements being made off axis.

Radii of Curvature Measurements

Contact lens power depends upon the combination of the powers of the front and back surfaces of the contact lens modulated by the refractive index of the material and contact lens thickness. The powers of the front and back surfaces of the contact lens depend upon the radii of these surfaces.

The relationship between the power and the radius in air is Power=(Contact lens refractive index−1)/Radius; the power is in diopters and the radius in meters.

For the front surface, the radius is defined in ISO18369-1:2006 (E) (2.1.2.2.5) as the radius of curvature of the front optic zone of a surface with a single refractive element.

The radii of curvature of the front of the PMMA domes were measured with an auto-keratometer also known as ophthalmometer which is one of the methods prescribed in ISO DIS18369-3:2016 (Annex C). The ophthalmometer method measures the reflected image size of a target placed at a known distance in front of a rigid or soft lens surface and the relationship between curvature and magnification of the reflected image is then used to determine the back optic zone radius. Nevertheless, this method was used to measure the front surface radii of the PMMA domes.

Light Transmittance

The luminous transmittance is defined in ISO 18369-1: 2006 (E). The values presented in the table further below for luminous transmittance represent the mean between 380 nm and 780 nm. The method of measurement is detailed in ISO DIS18369-3:2106 (4.8.2).

Apparatus and Materials

To demonstrate the principles of the invention a series of experiments were carried out. The experiments were run using:

Raw Materials

2-Hydroxyethyl methacrylate (HEMA); 99.9% HEMA with 16 ppm MEHQ;
Ethyleneglycol dimethacrylate (EGDMA); Assay: 98.0%
Methacrylic acid (MAA); Assay: 99.0%
Trimethylolpropance trimethacrylate (TMPTMA), Technical Grade
Irgacure 651 photo-initiator from BASF Corp, Southfield, Mi
Irgacure 819 photo-initiator from BASF Corp, Southfield, Mi
Glass microscope slides from EMS, Hatfield, Pa. and from AmScope.
Tween 80 (polysorbate 80) surfactant
Reagent grade isopropanol
Deionized or distilled water
Sterile Saline Solution from Walgreens or B&L
Nitrogen gas cylinders (<0.1% oxygen) and/or liquid nitrogen tanks
Rotovap, glove bags, desiccators, brown bottles, syringes, 5 µm filters, lint-free towels, standard beakers, weighing scale (0.001 g accuracy), vacuum pump LED Sources and Measuring Instruments OMNI lamps with output at 365 nm and 400 nm.
Omnicure LM 2011 Light meter to measure intensity.
Honeywell Toxi Pro 544590VD simple gas Oxygen monitor. Gauge that reads below 33 millibars of oxygen.

3D Printing Station

Custom built with a) Fujifilm's Samba printing head and b) a conveyor belt to move substrate under print heads, then two different UV lamps. The entire printing station is contained in an enclosure with gas ports.

Example Series A—Preparation of Model Samples

In this series, square samples (10 mm by 10 mm) of uniform thickness of polymerized HEMA were prepared and evaluated.

Preparation of Substrate

Three drops of Tween 80 were added to 20 ml reagent grade isopropanol and filtered through a 3.1 µm filter. The glass slides were dipped in this solution three times and air-dried.

Preparation of Hydrating Solution

Mixed 5 drops of Tween 80 in 100 mL of deionized water and heated to 80-90° C.

Preparation of Polymerizable Mixtures

PM-1A, PM-1B and PM-1C:
HEMA: 97.7
EGDMA: 1.6%
Irgacure 819: 0.2%
Irgacure 651: 0.5%
PM-2:
HEMA: 98.1
EGDMA: 1.2
Irgacure 819: 0.2%
Irgacure 651: 0.5%
PM-3A, PM-3B AND PM-3C Uncatalyzed polymerization mixture samples (PM-1A, PM-1B, PM-1C, PM-2, PM-3A, PM-3B and PM-3C; see above) were prepared by mixing the monomers and cross-linkers in brown bottles and left in the refrigerator overnight. The final polymerization mixture samples, along with the photoinitiators, were processed in a Rotovap using alternate cycles of degassing and nitrogen blanketing. The samples weighed approximately 120 grams for each of PM-1A, PM-1B, PM-1C and PM-2. The same quantity for each of PM-3A, PM-3B and PM3C was approximately 34.5 grams.

The resulting partial pressures corresponding to oxygen concentrations in the polymer mixture are as per below:
PM-1A: <0.5% $O_2$
PM-1B: 2.0% $O_2$
PM-1C: 5.0% $O_2$
PM-2: <0.5% $O_2$
PM-3A: <0.5% $O_2$
PM-3B: 2.0% $O_2$
PM-3C: 8.5% $O_2$ $O_2$ concentration of <0.5% $O_2$: A 120 g sample was processed per the following protocol via a Rotovap by alternating 3-4 cycles of degassing to 11.0-12.0 torr (approx 14.0 mbar) and blanketing with Nitrogen at 760 torr. One degassing cycle ranged from 5-20 minutes and one blanketing cycle did not exceed 5 mins.

$O_2$ concentration of 2.0% $O_2$: A 120 g sample was processed to 2.0% $O_2$ per the following protocol via a Rotovap by degassing to 72 torr (95 mbar) and blanketing with Nitrogen at 760 torr. The degassing cycle was 49 mins and the blanketing cycle did not exceed 15 minutes.

$O_2$ concentration of 5.0% $O_2$: A 120 g sample was processed to 5.0% $O_2$ per the following protocol via a Rotovap by degassing to 179 torr (235 mbar) and kept mixing for 45 min followed by blanketing with $N_2$ to 760 torr for a period not exceeding 5 minutes.

$O_2$ concentration of 8.0% $O_2$: A 120 g sample was processed to 8.5% $O_2$ per the following protocol via a Rotovap by degassing to 300 torr (400 mbar) and kept mixing for 45 min followed by blanketing with $N_2$ to 760 torr for a period not exceeding 15 minutes.

Settings of LED Sources and Printing Station

Omni lamp at 400 nm was set at 22.0 mms from substrate and intensity set at 4.5 W/cm² as measured by the light meter in the substrate position.

Omni lamp at 365 nm was set at 123 mms from substrate and intensity set at 0.63 W/cm² as measured by the light meter. Belt speed for moving substrate from the printing station to the UV station was set at 40 ft/min.

A 10 mm by 10 mm square design of the polymerizable mixture was printed. UV pinning or gelation (stringy/tacky to touch) occurred after 30 sec. (3 cycles of 10 sec.) of exposure to the 400 nm lamp. Measured thickness of the layer was about 24 µm. Several experiments were previously conducted at different intensity settings and exposure times to select the aforementioned condition.

3D Printing Conditions:

For UV pinning, at 2400 dpi, printing a layer and exposing to the 400 nm lamp for 30 sec. was done 6 times. Following this, the pinned or gelled sample was exposed for 120 sec. under the 365 nm lamp to cure the sample.

Oxygen concentration was measured by two oxygen probes, one mounted near the printing station and another located near the UV station. Control of oxygen was achieved by controlling the flow of separate streams of air and nitrogen that are mixed prior to entry into the processing enclosure.

Results

Cross-sections were made from the hydrated samples printed on the glass microscope slides by cutting through the middle of the sample with two stacked surgical blades number 23. The 400 micron wide cut was then placed on the side in a petri-dish with 0.9% saline solution, allowed to equilibrate for an hour and the shape was monitored with a microscope.

Non-uniformity or stresses can then be seen as deviation from the intended shape, which in this case is flat.

Non-uniformity or stresses will adversely affect the optical properties of the material.

The appearance and tackiness of the non-hydrated sample (after curing at 365 nm) were evaluated by "visual inspection" and "by touch" respectively.

The light transmittance value for the hydrated hydrogel sample (10 mm×10 mm) prepared as described above as well as that of a commercial ACUVUE 2 contact lens as a reference (transmittance of 96.83%) was calculated as the mean between 380 nm and 780 nm. See the table below.

The center thickness of the hydrated samples was measured optically with the microscope on cross-sections.

Evaluation of Hydrated Hydrogel Samples

The oxygen level in the processing atmosphere seems to have a very strong impact on the formed article. The light transmittance of the hydrated samples, which is important for the optical function, is quite high at the low levels of oxygen in the processing atmosphere (0.1%, 0.5% and 1.0%) and comparable to a commercially available contact lens. At 2.0% oxygen in the processing atmosphere, there is a decrease in light transmittance and at 5.0% oxygen, a considerable decrease in light transmittance results. Similarly, the cross-sections of the hydrated samples show that the lowest level of deformation is obtained with the low levels of oxygen in the processing atmosphere.

The oxygen level in the polymerizable mixture has some effect on the light transmission, but up to 5.0% oxygen can be acceptable if oxygen in the processing atmosphere is low. The cross-sections of the hydrated samples show the lowest level of deformation at 2.0% and 5.0% oxygen in the polymerizable mixture in combination with the low level of oxygen in the processing atmosphere.

A low level of deformation as seen on the cross-sectioned samples indicates that the product is uniform and suitable for optical applications.

For samples made with polymerization mixtures PM-3A, PM-3B and PM-3C, observations were made based on touch after 6 layers were printed and pinned without curing.

The oxygen concentration in the atmosphere was maintained at <0.5 volume-% and was measured by an oxygen probe mounted close to both printing and pinning stations. Control of the oxygen concentration was achieved by a flowmeter connected to a nitrogen tank.

Results

PM-3A having <0.5% Oxygen: Slightly tacky but not stringy

PM-3B having 2.0% Oxygen: Slightly tacky but not stringy

PM-3C having 8.5% Oxygen: Tacky and stringy

Example Series B—Preparation of Hydrogel Surfaces on PMMA Domes

In this series, dome shaped samples of varying thickness of polymerized HEMA were prepared and evaluated.

Preparation of Polymerizable Mixture

HEMA: 97.9-98.1%

EGDMA: 1.2-1.4%

Irgacure 651: 0.5%

Irgacure 819: 0.2%

The polymerizable mixture was prepared as described in a previous experiment that corresponded to an oxygen equilibrium concentration of <0.5 volume-% such as in preparation of PM-1A and PM-2.

3D Printing Conditions:

PMMA (poly(methyl methacrylate)) domes after Tween 80 treatment, were degassed overnight, labeled "D" and "E" and then used as the substrates. Six layers were deposited in diameters ranging from 4 mm to 11 mm with UV pinning at 400 nm for 15 secs after printing each layer and a final cure was done for 120 secs at 365 nm.

Results

The measurements of the two PMMA domes on which the hydrogel surface was printed were made three times and the measurements include three values: flattest radius of curvature, steepest radius of curvature and principal axis.

PMMA Dome D Tilted Up & Right:

1. 8.09/8.06 @ 180
2. 8.10/7.94 @ 120
3. 8.12/7.95 @ 112

Mean: 8.10/7.99

PMMA Dome E Tilted Up & Very Slightly Left:

1. 8.16/7.97 @ 82
2. 8.16/7.97 @ 97
3. 16/7.96 @ 94

Mean: 8.16/7.97

The results demonstrate the following:

i. Presence of a regular optical surface (this is a required feature of the surface to be able to make measurements with the auto-keratometer);

ii. Highly repeatable measurements of both the flattest and steepest radii: Dome D: Flat range 0.03 mm; Steep range 0.12 mm; Dome E: Flat range 0.00 mm; Steep range 0.01 mm. The axis indicates the principal direction and varies due to setting up the dome in front of the instrument without any specific markings, hence this variation is of no relevance.

iii. Both domes exhibited a small amount of astigmatism. The astigmatism was calculated based upon two assumed refractive indices using the power equation described under "Radii of Curvature Measurements".

PMMA Dome D with Hydrogel Surface (n=1.49) Power 1=60.49 D; Power 2=61.32 D; Astigmatism=0.83 D; (n=1.42) Power 1=51.85 D; Power 2=52.57 D; Astigmatism=0.72 D.

PMMA Dome F with Hydrogel Surface (n=1.49) Power 1=60.05 D; Power 2=61.48 D; Astigmatism=1.43 D; (n=1.42) Power 1=51.47 D; Power 2=52.69 D; Astigmatism=1.22 D.

The front surfaces of the PMMA Domes printed with hydrogel surfaces above correspond to the front surfaces of equivalent front surface toric contact lenses, with Dome D equivalent to a 0.75 D toric contact lens and Dome E equivalent to a 1.25 D toric contact lens.

Example Series C—Preparation of Embedded Inserts

Preparation of Polymerizable Mixture:

Same as in Example series B. The polymerizable mixture was prepared as described in a previous experiment that corresponded to an oxygen equilibrium concentration of <0.5 volume-% such as in preparation of PM-1A and PM-2.

3D Printing Conditions:

The oxygen concentration in the atmosphere was maintained at <0.5 volume-% and was measured by two oxygen probes, one mounted near the printing station and another located near the UV station. Control of the oxygen concentration was achieved by a flowmeter connected to a nitrogen tank.

Degassed polypropylene spheres treated with Tween 80 were used as substrates. Six layers were deposited in diameters ranging from 4 mm to 11 mm with UV pinning at 400 nm for 15 secs after printing each layer. A blue tinted PMMA insert (6 mm diameter and 50 microns thick) after Tween 80 treatment, was degassed overnight, was placed on the pinned layers and two additional layers were deposited in 11 mm diameter with UV pinning at 400 nm for 15 secs after pinning each layer. A final cure was done for 120 secs at 365 nm.

Result:

The blue tinted PMMA insert can be clearly observed and was found to be totally embedded within the hydrogel device. In addition, this method can be used to manufacture soft contact lenses with rigid inserts to mask astigmatism.

Example Series D—Preparation of Embedded Reservoirs or Depots

Preparation of Polymerizable Mixture:

Same as in preparation of PM-2. The polymerizable mixture was prepared as described in a previous experiment that corresponded to an oxygen equilibrium concentration of <0.5 volume-% such as in preparation of PM-1A and PM-2.

3D Printing Conditions:

The oxygen concentration in the atmosphere was maintained at <0.5 volume-% and was measured by two oxygen probes, one mounted near the printing station and another located near the UV station. Control of the oxygen concentration was achieved by a flowmeter connected to a nitrogen tank Tween 80 treated glass hemispheres measuring 13 mm in diameter were used as substrates. 15 layers were deposited with a diameter of 9.5 mms with UV pinning at 400 nm for 15 secs after printing each layer. A small piece of a plastic micropipette packed with food coloring crystals was then placed on the pinned 15 layers. Three additional layers with a diameter of 9.5 mms were deposited with UV pinning at 400 nm for 15 secs after printing each layer. A few additional drops of the polymerizable mixture were deposited to ensure complete encapsulation of the micropipette piece and the assembly was cured for 120 secs at 365 nm.

Result:

The plastic micropipette containing food coloring crystals can be clearly observed and was totally embedded within the hydrogel device. This method demonstrates the embedding of functional additive releasing reservoirs or depots within ophthalmic devices such as contact lenses. Subsequent hydration of the assembly in water showed the hydrating water was tinted and the absence of the food coloring crystals in the micropipette piece.

Example Series E—Preparation of Ophthalmic Devices with Asymmetric Designs

Preparation of Polymerizable Mixture.

Same as in preparation of PM-2. The polymerizable mixture was prepared as described in a previous experiment that corresponded to an oxygen equilibrium concentration of <0.5 volume-% such as in preparation of PM-1A and PM-2.

3D Printing Conditions:

The oxygen concentration in the atmosphere was maintained at <0.5 volume-% and was measured by two oxygen probes, one mounted near the printing station and another located near the UV station. Control of the oxygen concentration was achieved by a flowmeter connected to a nitrogen tank.

Tween 80 treated glass hemispheres measuring 13 mm in diameter were used as substrates. Ten layers with an asymmetrical design (Atheneum Optical Sciences Logo) measuring about 6 mm by 4 mm were deposited on the substrate with UV pinning at 400 nm for 15 secs after printing each layer. Then 17 layers were deposited with UV pinning at 400 nm for 15 secs after printing each layer. The assembly was then cured for 120 secs at 365 nm.

Result:

The asymmetrical design of the logo can be clearly observed within the hydrogel device before and after hydration in saline solution. This method demonstrates the viability of incorporating asymmetric structures to correct asymmetric refractive errors in ophthalmic devices such as contact lenses.

Example Series F—Preparation of Samples with Image Quality Optics and Refractive Corrections Preparation of Polymerizable Mixture:
HEMA: 95.4%
MAA: 2.5%
EGDMA: 1.2%
TMPTMA: 0.1%
Irgacure 819: 0.3%
Irgacure 651: 0.5%

The polymerization mixture was prepared as described in a previous experiment that corresponded to an oxygen equilibrium concentration of <0.5 volume-% similar to the preparation of PM-1A and PM-2.

3D Printing Conditions:

The oxygen concentration in the atmosphere was maintained at <0.5 volume-% and was measured by an oxygen probe mounted close to both printing and pinning stations. Control of the oxygen concentration was achieved by flowmeters connected to a nitrogen tank. The Samba print head resolution was set at 1200 dpi.

10.0 mm diameter circular designs were printed to generate the samples. Belt speed was set at 10.0 feet per minute. UV pinning or gelation occurred after 10 sec exposure to the 400 nm UV lamp. Curing was done for 120 sec by exposure to the 365 nm UV lamp. With printed prescriptions, foundation layers were first printed, pinned and cured; thereafter each prescription layer was pinned and then cured for 120 secs after which a top or final coat was printed, pinned and cured. Substrates used for preparing the samples were glass microscope slides treated with Tween 80 as described in Example series A. Power in diopters (D) was measured with a Topcon CL-200 lensometer. Dry power was measured on the printed sample inclusive of the glass slide substrate while the wet power was measured after releasing the sample from the hydrating solution (heated distilled water containing Tween 80 as described earlier) and then equilibrating in saline solution for more than 20 hours. The diameter of the hydrated samples was measured to be 13.9±0.1 mm.

The results are shown in the Table below:

| SAMPLE | TARGET/ DESIGN POWER (D) | FOUNDATION LAYERS (NUMBER) | PRESCRIPTION LAYERS (NUMBER) | MEASURED DRY POWER (D) | MEASURED WET POWER (D) |
|---|---|---|---|---|---|
| 1 | — | 5 | — | 0.00 to 0.25 | 0.00 to 0.25 |
| 2 | — | 10 | — | 0.00 to 0.25 | 0.00 to 0.25 |
| 3 | +1.00 | 10 | 3 | 0.75 ± 0.00 | 0.75 ± 0.25 |
| 4 | +3.00 | 10 | 3 | 3.00 ± 0.25 | 2.75 to 3.00 |

Results:

The dry and wet power results shown in the table above indicate that three-dimensional deposition printing can produce optical devices with image quality optics such as ophthalmic lenses to correct refractive errors.

The invention claimed is:

1. A method for three-dimensional deposition printing of an optical element, in which method a plurality of droplets of a polymerizable mixture are deposited onto a surface of a substrate under a controlled atmosphere thereby forming successive layers of droplets of the polymerizable mixture, wherein the controlled atmosphere has an oxygen concentration of up to 5.0 volume-%, and wherein the polymerizable mixture has an oxygen equilibrium concentration that is up to 8.0 volume-%.

2. The method according to claim 1, wherein the oxygen concentration in the controlled atmosphere is at up to 2.0 volume-% and/or lower than the oxygen equilibrium concentration in the polymerizable mixture.

3. The method according to claim 1, further comprising exposing said successive layers of droplets to actinic radiation after deposition of each layer and after the deposition of a final of the successive layers of droplets for forming the optical element; optionally wherein the successive layers of droplets achieve partial polymerization or gelation to allow subsequent droplets and layers to meld and form distortion free structures.

4. The method according to claim 1, wherein the polymerizable mixture contains one or more polymerization initiators.

5. The method according to claim 4, further comprising a curing process wherein a first polymerization initiator is used in partially curing the successive layers, and a second polymerization initiator is used to complete the curing process.

6. The method according to claim 1, wherein said surface of said substrate is pre-treated with a surface active agent or by plasma treatment prior to deposition of the first of the successive layers.

7. The method according to claim 1, wherein the optical element is subsequently released from the substrate.

8. The method according to claim 1, wherein the polymerizable mixture comprises methacrylate or acrylate monomers, optionally wherein the monomers are selected from hydroxyethyl methacrylate (HEMA) and hydroxyethyl acrylate (HEA), and optionally wherein the method comprises the subsequent step of swelling the optical element in water, whereby the optical element obtains a water content from 10 to 80 weight-%.

9. The method according to claim 1, wherein the polymerizable mixture comprises reactive silicone monomers or oligomers, optionally wherein the method comprises the subsequent step of swelling the optical element in water, whereby the optical element obtains a water content from 5 to 70 weight-%.

10. The method according to claim 1, wherein the polymerizable mixture after polymerization provides a polymer which is non-swellable in water.

11. The method according to claim 1, wherein the polymerizable mixture of one or more of the layers of droplets comprises a pigment.

12. The method according to claim 1, wherein the polymerizable mixture includes one or more cross-linkers in an amount of 0.5 to 5.0 weight-%, one or more non-reactive diluents in an amount of 0 to 60.0 weight-%, and one or more polymerization inhibitors in an amount of less than 100.0 ppm, based on the weight of the polymerizable mixture.

13. The method according to claim 1, wherein the optical element is an ophthalmic device selected from a spectacle lens, a contact lens, an overlay lens, an intraocular lens, a corneal implant, and an ophthalmic/ocular insert; optionally wherein the ophthalmic device is a contact lens to correct refractive errors in keratoconus and astigmatic corneas.

14. The method according to claim 13, wherein the ophthalmic device has an asymmetrical design.

15. The method according to claim 1, wherein the optical element comprises one or more objects embedded therein; optionally wherein the one or more objects includes a solid object selected from inserts, electronics, and functional additive releasing reservoirs or depots.

16. The method according to claim 15, wherein the optical element is a soft contact lens which has a rigid embedded insert to mask astigmatism.

17. The method according to claim 1, wherein the optical element comprises one or more functionally active substances including biologically active substances.

18. The method according to claim 1, wherein the optical element is formed through a plurality of print heads with the first print head dispensing droplets of a first polymerizable mixture and one or more additional print head(s) each dispensing droplets of compositions selected from the first polymerizable mixture, a second polymerizable mixture which is compositionally different from said first polymerizable mixture, and a non-polymerizable mixture.

19. The method according to claim 18, wherein said first and/or second polymerizable mixture comprise functionally active substances, and/or wherein said non-polymerizable mixture comprises functionally active substances.

20. The method according to claim 1, wherein the substrate is an ophthalmic device of which one or more surfaces functions as the substrate.

21. The method according to claim 4, wherein the one or more polymerization initiators are selected from thermal initiators and photo-initiators.

22. The method of claim 4, wherein the photo-initiators have responsiveness to different wavelengths of actinic radiation.

* * * * *